United States Patent [19]

Yagi et al.

[11] Patent Number: 4,680,631
[45] Date of Patent: Jul. 14, 1987

[54] TELEVISION COMPOSITE VIDEO SIGNAL PROCESSING CIRCUIT

[75] Inventors: Motoi Yagi, Zushi; Tadao Miyabayashi, Tokyo, both of Japan

[73] Assignee: Tokyo Electric Co., Ltd., Tokyo, Japan

[21] Appl. No.: 774,976

[22] Filed: Sep. 11, 1985

[30] Foreign Application Priority Data

Sep. 19, 1984 [JP] Japan ................. 59-196219
Sep. 29, 1984 [JP] Japan ................. 59-204916

[51] Int. Cl.⁴ ........................................ H04N 5/14
[52] U.S. Cl. ........................ 358/160; 358/177; 358/166
[58] Field of Search ............. 358/37, 160, 166, 168, 358/172, 327, 176, 177

[56] References Cited

U.S. PATENT DOCUMENTS

| | | | |
|---|---|---|---|
| 3,699,246 | 10/1972 | Hodge | 358/160 |
| 3,804,979 | 4/1974 | Knowles | 358/160 |
| 3,813,487 | 5/1974 | Cowhan et al. | 358/160 |
| 4,183,064 | 1/1980 | Sahara et al. | 358/166 |
| 4,212,032 | 7/1980 | Harford | 358/177 |
| 4,216,502 | 8/1980 | Fox | 358/160 |
| 4,228,460 | 10/1980 | Rotter | 358/177 X |
| 4,399,460 | 8/1983 | Harwood et al. | 358/166 |
| 4,408,229 | 10/1983 | Harford | 358/177 |
| 4,418,363 | 11/1983 | Kelleher | 358/177 X |
| 4,544,951 | 10/1985 | Yoshisato | 358/172 |
| 4,549,213 | 10/1985 | Illetschko | 358/167 |

FOREIGN PATENT DOCUMENTS 0071360 5/1980 Japan ................. 358/166
0081989 5/1985 Japan ................. 358/166

OTHER PUBLICATIONS

"The Electronic Still Camera a New Concept in Photography", pp. 325–331, Nakamura & Saito & Kambara.

Primary Examiner—Michael A. Masinick
Assistant Examiner—E. Anne Toth
Attorney, Agent, or Firm—Frishauf, Holtz, Goodman & Woodward

[57] ABSTRACT

A television composite video signal processing circuit has a readout circuit for repeatedly reading out a one-field composite video signal from a disk memory. A delay circuit delays the composite video signal from the readout circuit by ½ of a horizontal sync signal period H, and a pedestal clamping circuit sets the pedestal levels of the composite video signals from the delay circuit and the readout circuit to a predetermined level. A signal selector alternately supplies the composite video signals from the readout circuit and the delay circuit to the pedestal clamping circuit for every other field, and a peak level correction circuit corrects the peak level of the delayed video signal in the delayed composite video signal from the delay circuit. The peak level correction circuit corrects the peak level of the delayed video signal so as to match this peak level with that of the nondelayed video signal from the readout circuit in accordance with a peak level difference between the delayed and nondelayed video signals.

26 Claims, 14 Drawing Figures

TELEVISION COMPOSITE VIDEO SIGNAL PROCESSING CIRCUIT

BACKGROUND OF THE INVENTION

The present invention relates to a television composite video signal processing circuit used for reading out a composite video signal from a disk memory in a still video floppy system to display the readout composite video signal on a television monitor.

Conventional television systems employ a ½ interlaced scanning procedure. For example, in the NTSC system, a vertical scanning period of one field is 262.5H (where H is the period of the horizontal sync signal). One frame consists of two fields which include 525 horizontal scanning lines. For this reason, when one-field composite video signal is repeatedly reproduced from the disk memory of the still video floppy system which stores the one-field composite video signal, i.e., a 262.5H composite video signal in one track of the disk memory, the horizontal sync signal is deviated by 0.5H at the start point or the end point of each track. In a normal television receiver, distortion occurs on the screen due to this deviation, and a normal display cannot be performed. Demand has arisen for causing a 0.5H delay circuit to delay the signal reproduced from the disk memory for every other field and producing signals so as to generate horizontal sync pulses at substantially equal time intervals throughout a plurality of fields.

When the 0.5H delay circuit is constituted by a charge-coupled device, a level of the reproduction signal is changed by nonlinear signal attenuation. A level difference between the composite video signal which is delayed for every other field and the nondelayed composite video signal occurs, thus changing the brightness on a television monitor at the frame frequency. As a result, the screen image flickers, deteriorating the quality of the screen image. In particular, when the peak level of the video signal is high and the screen image is bright, intense flickering is observed. Even if the peak level of the video signal is changed by about 1%, annoying flickering which is sensible to eyes occurs.

SUMMARY OF THE INVENTION

It is an object of the present invention to provide a television composite video signal processing circuit for matching a peak level of a delayed reproduction video signal with that of a nondelayed reproduction video signal and providing a composite video signal free from flickering.

In order to achieve the above object of the present invention, there is provided a television composite video signal processing circuit for producing a television composite video signal for image display, comprising a reproduction circuit for producing a reproduction signal which is obtained by repeatedly reading out a composite video signal of one field from a video signal memory medium and is used to constitute a composite video signal for displaying an image in accordance with a ½ interlaced scanning procedure; a 0.5H delay circuit, constituted by a charge-coupled device, for delaying the reproduction signal from the reproduction circuit by ½ of a period of a horizontal sync signal; a signal selecting circuit for alternately passing therethrough a delayed reproduction signal from the delay circuit and a reproduction signal from the reproduction circuit for every field; a pedestal clamp circuit for selectively setting pedestal levels of the delayed reproduction signal from the delay circuit and the reproduction signal from the reproduction circuit to match the pedestal levels with each other in accordance with an output signal from the signal selecting means; a peak level correction circuit for correcting a peak level of a delayed video signal of the delayed reproduction signal from the delay circuit; and a sync tip level setting circuit for setting to a preset potential the delayed and nondelayed reproduction signals which are respectively supplied from the delay circuit and the reproduction circuit through the signal selecting circuit, the peak level correcting circuit being operated to correct the peak level of the delayed video signal of the delayed reproduction signal from the delay circuit to match the peak level of the delayed reproduction signal with that of the nondelayed reproduction signal from the reproduction circuit in accordance with a peak level difference between the delayed and nondelayed video signals.

According to the present invention, the peak level of the delayed video signal is corrected in accordance with the peak level difference between the delayed video signal from the delay circuit and the nondelayed video signal from the demodulation circuit, so that the peak levels of the delayed and nondelayed video signals completely match each other.

DETAILED DESCRIPTION OF THE PREFERRED EMBODIMENT

Before explaining a preferred embodiment of the present invention, a conventional composite video signal processing circuit will be described in detail with reference to FIGS. 1A, 1B and 2.

Figure 1A:
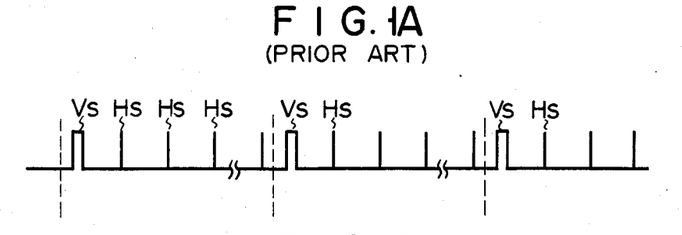
FIGS. 1A and 1B are, respectively, timing charts of vertical and horizontal sync signals read out from a disk memory and those delayed in accordance with a conventional technique.
Figure 1B:
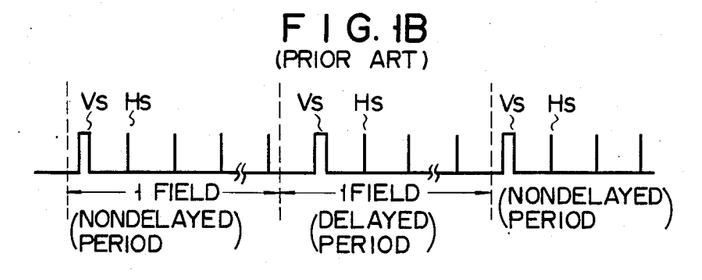

FIG. 1A shows a reproduction signal obtained by repeatedly reading out a one-field composite video signal from a disk memory, and FIG. 1B is a reproduction signal obtained by delaying the reproduction signal of FIG. 1A by 0.5H for every other field. Referring to FIGS. 1A and 1B, reference symbol Vs denotes a vertical sync signal; and Hs, a horizontal sync signal. The vertical and horizontal sync signals are delayed by 0.5H in FIG. 1B.

Figure 2:
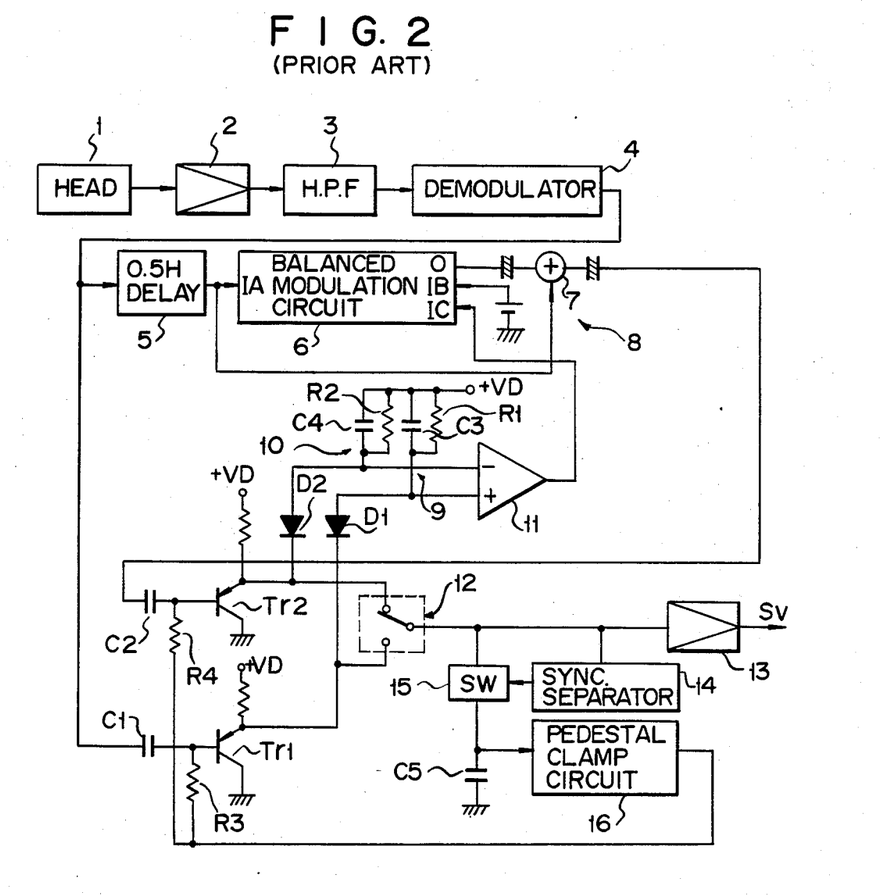
FIG. 2 is a circuit diagram of a conventional television composite video signal processing circuit.

In the conventional composite signal processing circuit shown in FIG. 2, a reproduction signal which is obtained by repeatedly reading out one frame of a composite video signal from the disk memory by a head 1 is supplied through an amplifier 2 and a high-pass filter (HPF) 3 to a demodulator 4. A reproduction signal generated from the demodulator 4 is supplied to a 0.5H delay circuit 5 and to the base of a pnp transistor Tr1 through a capacitor C1. The 0.5H-delayed reproduction signal from the delay circuit 5 is supplied to the base of a pnp transistor Tr2 through a level correction circuit 8 formed of a balanced modulation circuit 6 and an adder 7 and further through a capacitor C2. Sync tip signals of the reproduction signals appearing at the emitters of the transistors Tr1 and Tr2 are detected by sync tip level detectors 9 and 10 which respectively comprise diodes D1 and D2, capacitors C3 and C4 and resistors R1 and R2. The detected signals are supplied to a differential amplifier 11. The amplifier 11 detects a sync tip level difference between the delayed reproduction signal and the nondelayed reproduction signal. The amplifier 11 supplies a difference signal as an error voltage to the circuit 6. The circuit 6 amplifies the input signal in accordance with a magnitude of the error voltage, so that the adder 7 generates a delayed reproduction signal whose level is corrected to accord with the level of the nondelayed reproduction signal. The delayed and nondelayed reproduction signals are alternately extracted from the emitters of the transistors Tr1 and Tr2 through an analog switch 12 alternately switching its contacts for every field. The extracted signals are supplied to an output amplifier 13. A sync separator 14 is arranged between the switch 12 and the amplifier 13. The separator 14 generates a pulse having a pulse width within the pedestal period of the reproduction signal. A switch 15 is kept on in the pedestal period in response to the pulse from the separator 14, so that a voltage at the pedestal level of the reproduction signal is held in a capacitor C5. The pedestal level voltage held by the capacitor C5 is applied to a pedestal clamp circuit 16. An output from the circuit 16 is supplied to the bases of the transistors Tr1 and Tr2 through corresponding resistors R3 and R4, so that the pedestal level of the nondelayed reproduction signal matches with that of the delayed reproduction signal.

Figure 3:
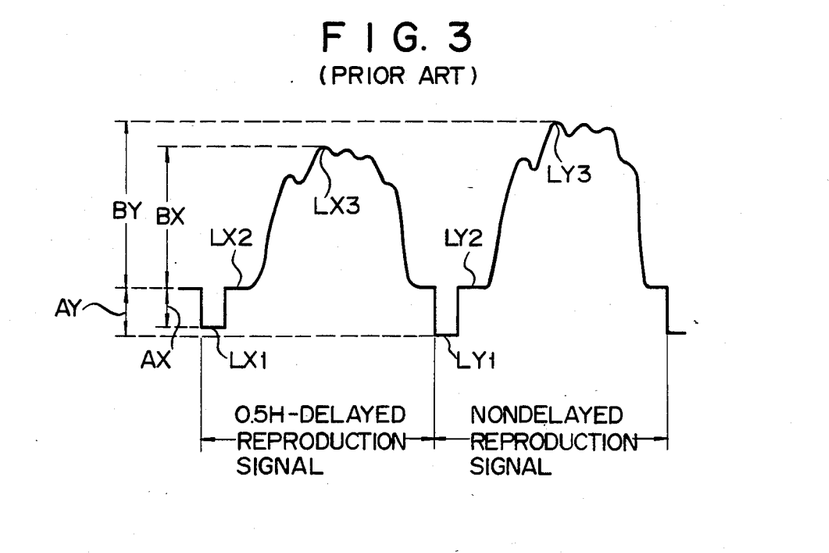
FIG. 3 is a timing chart of a 0.5H-delayed reproduction signal and a nondelayed reproduction signal.

In the conventional circuit, the pedestal level of the nondelayed reproduction signal is matched with that of the delayed reproduction signal, then the level of the video signal is corrected in accordance with the sync tip level difference, and the level-corrected reproduction signal is generated as a composite video signal Sv from the amplifier 13. When the difference between a pedestal level LX2 of the 0.5H-delayed reproduction signal and a sync tip level LX1 is AX, the difference between the pedestal level LX2 and a peak level LX3 of the video signal is BX, the difference between a pedestal level LY2 (=LX2) of the nondelayed reproduction signal and the sync tip level LY1 is AY, and the difference between the pedestal level LY2 and the peak level LY3 of the video signal is BY, and at the same time, when the delay circuit 5 has a linear characteristic and a gain loss is constant independently of the signal level, relation BY/AY=BX/AX is established. In this case, if level correction is performed by comparison between the magnitudes of the sync tip pulses of the delayed and nondelayed video signal, the peak levels of the delayed and nondelayed video signals can be kept substantially the same. However, when the delay circuit is constituted by a charge-coupled device causing nonlinear distortion, BY/AY=BX/AX is not established. As a result, when level correction is performed by comparison of the sync tip levels of the video signal, the levels of the delayed and nondelayed video signals cannot match each other, resulting in flickering on the screen.

The present inventors noted such a drawback and assumed that level correction of the delayed video signal could be effectively performed when a peak level difference between the delayed and nondelayed video signals was used in place of a sync tip level difference therebetween.

A television composite video signal processing circuit according to an embodiment of the present invention will be described with reference to FIG. 4. In the composite video signal processing circuit, a head 21 repeatedly reads out any one-field composite video signal as a reproduction signal from a disk memory as a video signal storage medium for storing a plurality of one-field composite image signals used for displaying an image in accordance with the ½ interlaced scanning procedure. The reproduction signal read by the head 21 is supplied through an amplifier 22 and a high-pass filter 23 to a demodulator 24. The demodulator 24 supplies the reproduction signal to a 0.5H delay circuit 25 constituted by, for example, a charge-coupled device and to the base of a pnp transistor Tr1 through a capacitor C1. The circuit 25 delays the reproduction signal by ½ of a period H of the horizontal sync signal. The 0.5H-delayed reproduction signal is supplied to an input terminal IA of a balanced modulation circuit 26 and the first input terminal of an adder 27. The circuit 26 and the adder 27 constitute a video peak level correction circuit. An input terminal IB of the circuit 26 receives a reference voltage obtained by a voltage-dividing circuit formed of resistors, and an input circuit IC of the circuit 26 receives an error voltage from a peak level difference detector. The circuit 26 processes the input reproduction signal in accordance with a gain corresponding to the magnitude of the error voltage and generates a positive or negative signal at an output terminal O7 thereof. The positive or negative signal is supplied to the second input terminal of the adder 27. The adder 27 superposes the signal from the circuit 26 on the delayed reproduction signal from the delay circuit 25 and corrects the level of the resultant reproduction signal. The levelcorrected delayed reproduction signal is supplied to the base of a pnp transistor Tr2 through a capacitor C2. The collector of the transistor Tr1 is grounded, and its emitter is connected to a stationary contact 28A of an analog switch 28, and to one end of a parallel circuit (the other end of which is grounded) of a resistor RX2 and a capacitor CX and to the base of an emitter follower npn transistor Tr3 through a forward-biased diode DX and a resistor RX1. The collector of the transistor Tr2 is grounded, and its emitter is connected to a stationary contact 28B of the switch 28, and to the other end of a parallel circuit (one end of which is grounded) of a resistor RY2 and a capacitor CY and to the base of an emitter follower npn transistor Tr4 through a forward-biased diode DY and a resistor RY1. The transistor Tr3 and the parallel circuit of the diode DX, the resistors RX1 and RX2 and the capacitor CX constitute a peak level detector PLD1 for detecting a peak level of the nondelayed reproduction video signal and generating a signal corresponding to the detected peak level. The transistor Tr4 and the parallel circuit of the diode DY and the resistors RY1 and RY2 and the capacitor CY constitute a peak level detector PLD2 for detecting the peak level of the delayed reproduced video signal and generating a corresponding output signal. The collectors of the transistors Tr3 and Tr4 are connected to a position power supply terminal +VD. The emitters of the transistors Tr3 and Tr4 are grounded through the corresponding resistors. In this circuit, when capacitances of the capacitors CX and CY are considerably increased, the average value of the peak levels can be detected as the peak level even if the peak components greatly fluctuate in level. The emitter of the transistor Tr3 is connected to the noninverting input terminal of a differential amplifier 30 constituting the peak level difference detector through an operational amplifier 29 of a voltage follower type. The emitter of the transistor Tr4 is connected to the inverting input terminal of the amplifier 30. The amplifier 30 receives the peak component of the nondelayed video signal and that of the delayed video signal from the transistors Tr3 and Tr4 and detects the level difference therebetween. The level difference is generated as an error voltage from the amplifier 30, and the error voltage is applied to an input terminal IC of the circuit 26 through a resistor.

A common contact 28C of the switch 28 is connected to one end of a resistor R7 which is connected at the other end to the power supply terminal +VD, and to the base of an npn transistor Tr6. The collector of the transistor Tr6 is connected to the power supply terminal VD, and the emitter of the transistor Tr6 is grounded through a resistor. The emitter is also grounded through a series circuit of a switch 31 and a capacitor C5 and is connected to the input terminal of a sync separator 32 and to the input terminal of an output amplifier 33 through a series circuit of resistors R8 and R9. The separator 32 generates a pedestal pulse having a pulse width within the pedestal period of the reproduction signal and a sync pulse. The switch 31 is turned on in the pedestal period in response to the pedestal pulse. The sync pulse is supplied to the base of an npn transistor Tr5 constituting the sync tip level setting circuit. The voltage across the capacitor C5 is applied to the input terminal of a pedestal clamp circuit 34. The output from the circuit 34 is supplied to the base of the transistor Tr1 through a resistor R10 and to the base of the transistor Tr2 through a resistor R11. W The resistors R10 and R11, the switch 31, the capacitor C5 and the pedestal clamp circuit 34 constitute a pedestal level control circuit. The emitter of the transistor Tr5 is grounded through a capacitor C6 and is connected to a movable terminal of a variable resistor VR in a voltage-dividing circuit which includes a resistor R12, the variable resistor VR and a resistor R13 and which is connected between the power supply terminal +VD and ground. The collector of the transistor Tr5 is connected to the junction between the resistors R8 and R9. A resistor R14 is connected in the base-emitter path of the transistor Tr5.

In the signal processing circuit described above, the reproduction signal read out from the disk memory by the head 21 is generated through the amplifier 22, the filter 23, and the demodulator 24. The reproduction signal from the demodulator 24 is delayed by 0.5H by the circuit 25. The 0.5H-delayed reproduction signal from the circuit 25 is supplied to the circuit 26 and the adder 27. The delayed reproduction signal is superposed by the adder 27 on the output generated from the circuit 26, so that the level of the delayed reproduction signal is corrected. The level-corrected reproduction signal is supplied to the base of the transistor Tr2 through the capacitor C2. The nondelayed reproduction signal from the demodulator 24 is supplied to the base of the transistor Tr1 through the capacitor C1. The nondelayed reproduction signal appears at the emitter of the transistor Tr1. The delayed reproduction signal appears at the emitter of the transistor Tr2.

The peak level of the video signal included in the nondelayed reproduction signal from the transistor Tr1 is detected by the detector PLD1 including the diode DX, the resistors RX1 and RX2, the capacitor CX and the transistor Tr3 and an output signal corresponding to the detected peak level is supplied to the noninverting input terminal of the amplifier 30 through the amplifier 29. The peak level of the video signal of the delayed reproduction signal from the transistor Tr2 is detected by the detector PLD2 including the diode DY, the resistors RY1 and RY2, the capacitor CY and the transistor Tr4 and an output signal corresponding to the detected peak level is supplied to the inverting input terminal of the amplifier 30. The amplifier 30 compares the peak level of the video signal included in the nondelayed reproduction signal with that in the delayed reproduction signal and generates an error voltage corresponding to the peak difference. The balanced modulation circuit 26 amplifies the input reproduction signal with a gain determined by the error voltage obtained by comparing the peak level of the video signal of the nondelayed reproduction signal with that of the delayed reproduction signal. The level-corrected reproduction signal which is obtained by superposing the output from the circuit 26 on the delayed reproduction signal and which is generated from the adder 27 has a video signal whose peak level matches with that of the nondelayed reproduction signal.

The pedestal level of the reproduction signal obtained through the switch 28 is held in the capacitor C5 upon on/off operation of the switch 31. This voltage is applied to the base of the transistor Tr1 through the circuit 34 and then the resistor R10, and to the base of the transistor Tr2 through the resistor R11. Upon operation of the transistors Tr1 and Tr2, the pedestal level of the nondelayed reproduction signal matches with that of the delayed reproduction signal. The video signal in the delayed reproduction signal obtained through the analog switch 28 will be the same in peak and pedestal levels as that in the nondelayed reproduction signal obtained through the analog switch 28. This effect cannot be obtained by the conventional circuit shown in FIG. 2.

In the conventional signal processing circuit shown in FIG. 2, since the transistors Tr1 and Tr2 are kept in an operative state, the pedestal levels of the delayed and nondelayed reproduction signals are clamped by the output from the circuit 16 irrespective of the switching state of the switch 12. More particularly, the pedestal level of the reproduction signal blocked by the switch 12 is clamped by the pedestal level of the reproduction signal passing through the switch 12. In this case, if pedestal levels at the emitters of the transistors Tr1 and Tr2 are the same, no problem occurs. However, in practice, the pedestal levels of the delayed and nondelayed reproduction signals differ from each other due to a difference between the base-emitter voltages of transistors Tr1 and Tr2, or a difference between internal resistances of the switching paths of the switch 12. For this reason, the circuit 16 is used to cause the pedestal levels of the nondelayed and delayed reproduction signals to match each other. In practice, the pedestal level of the reproduction signal which appears at the emitter of the transistor Tr2 and is delayed in, for example, the signal processing circuit of FIG. 2 may become lower than the normal pedestal level. In this case, the pedestal level of the delayed reproduction signal must be increased by the pedestal clamp circuit 16 to the normal level. Further, the pedestal level of the nondelayed reproduction signal may be substantially the normal level and, at this time, it is not compensated by the pedestal clamp circuit 16.

When the delayed reproduction signal passes through the switch 12 and its pedestal level is set, the pedestal level of the delayed reproduction signal is set to the normal level. However, the pedestal level of the nondelayed reproduction signal at the emitter of the transistor Tr1 becomes higher than the normal level. On the contrary, when the nondelayed reproduction signal passes through the analog switch 12 and its pedestal level is set, the pedestal level of the delayed reproduction signal at the emitter of the transistor Tr2 becomes lower than the normal level.

Figure 4:
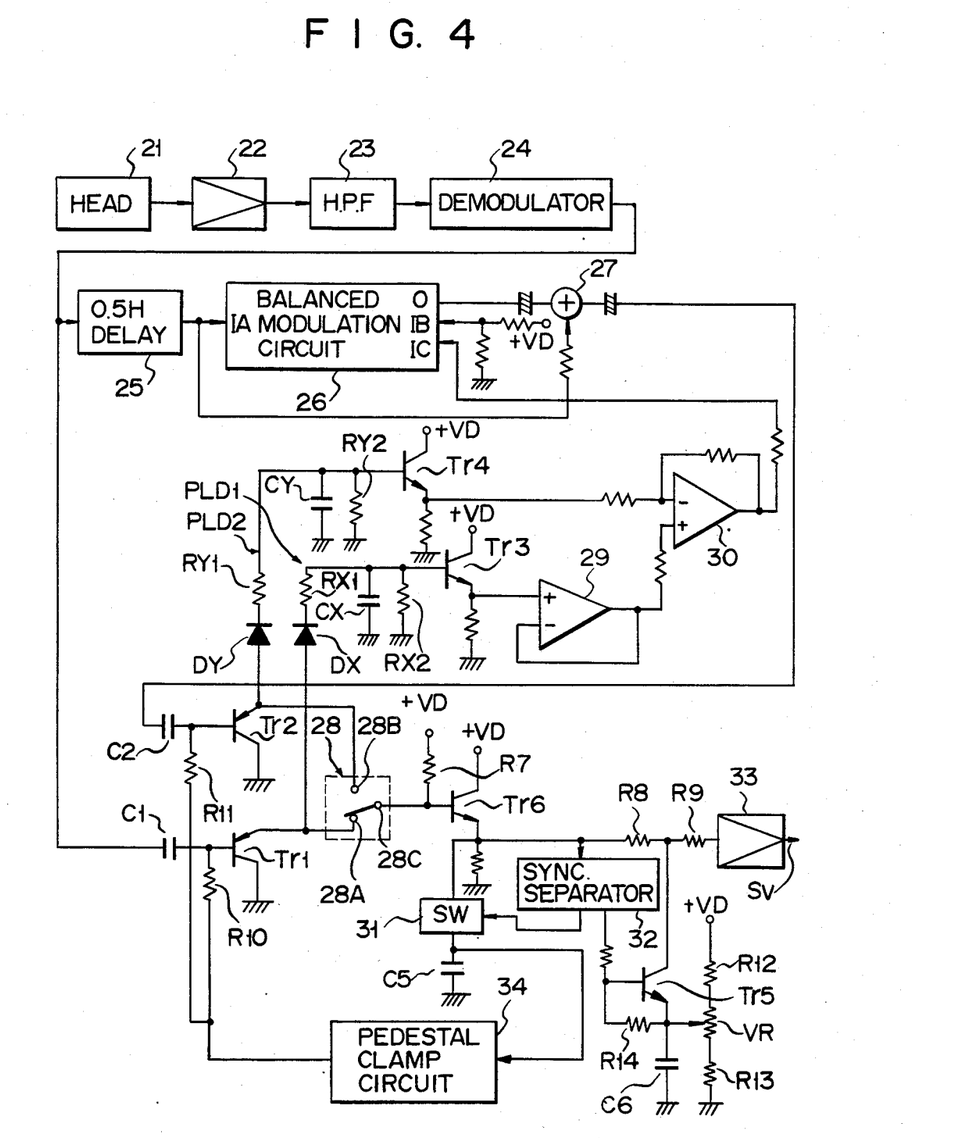
FIG. 4 is a circuit diagram of a television composite video signal processing circuit according to an embodiment of the present invention.
Figure 5A:
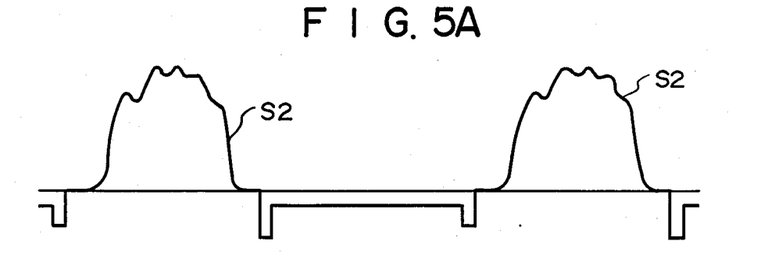
FIGS. 5A and 5B are respectively timing charts for explaining a pedestal clamping operation of the signal processing circuit shown in FIG. 4.
Figure 5B:
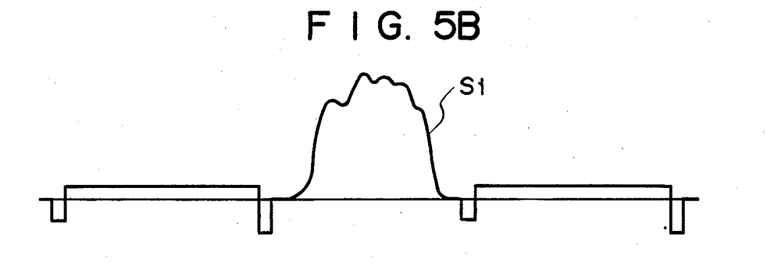

In the signal processing circuit of FIG. 4, however, when the contact 28C of the switch 28 is connected to the contact 28A, the emitter of the transistor Tr1 is connected to the power supply terminal VD through the switch 28 and the resistor R7, so that the nondelayed reproduction signal appears at the emitter of the transistor Tr1. Meanwhile, the emitter of the transistor Tr2 is not connected to the power supply terminal +VD and the transistor Tr2 is not operated. The peak level of the video signal of the reproduction signal appearing at the transistor Tr1 is detected by the peak level detector PLD1 including the diode DX, the resistors RX1 and RX2, the capacitor CX and the transistor Tr3. Only the pedestal level of the nondelayed reproduction signal is detected by the pedestal level control circuit. In this case, as shown in FIGS. 5A and 5B, only the nondelayed reproduction signal S1 having the normal pedestal level is detected by the peak level detector PLD1. On the other hand, when the contact 28C of the switch 28 is connected to the contact 28B, the emitter of the transistor Tr2 is connected to the power supply terminal +VD through the switch 28 and the resistor R7, and the delayed reproduction signal appears at the emitter of the transistor Tr2. In this case, the emitter of the transistor Tr1 is not connected to the power supply terminal +VD and the transistor Tr1 is not operated. The peak level of the video signal included in the reproduction signal appearing at the transistor Tr2 is detected by the peak level detector PLD2 including the diode DY, the resistor RY1 and RY2, the capacitor CY and the transistor Tr4. Only the pedestal level of the delayed reproduction signal is detected by the pedestal level control circuit. As shown in FIGS. 5A and 5B, only the delayed reproduction signal S2 having the normal pedestal level is detected by the peak level detector PLD2. In this manner, when the contact 28C is connected to the contact 28A, only the pedestal level of the nondelayed reproduction signal is controlled to be set at the normal level, and its peak level is detected by the peak level detector PLD1. However, when the contact 28C is connected to the contact 28B, only the pedestal level of the delayed reproduction signal is controlled to be set at the normal level, and its peak level is detected by the peak level detector PLD2. Therefore, the peak level detectors PLD1 and PLD2 detect the nondelayed and delayed reproduction signals whose pedestal levels are the normal level.

In the signal processing circuit of FIG. 4, the video signal of a given field has the same peak and pedestal levels as those of the next field.

In the signal processing circuit of FIG. 4, the transistor Tr5 is turned on in response to the sync pulse from the separator 32, so that a voltage held by the capacitor C6 and set by the resistor VR appears at the junction of the resistors R8 and R9. This voltage is set at a preset level at which the sync tip level of the reproduction signal is set, so that the sync tip level of the delayed and nondelayed reproduction signals is fixed to the preset level. The peak, pedestal and sync tip levels of the video signal of the reproduction signal from the amplifier 33 during the delayed period match with those during the nondelayed period. When the reproduction signals generated from the amplifier 33 are mixed to form a composite video signal which is then displayed on the television receiver, flickering will not occur, and a clear image can be obtained.

Since the resistors RX1 and RY1 are connected in series with the diodes DX and DY in the peak level detectors PLD1 and PLD2, respectively, transient noise superposed on the video signals can be prevented, and the average peak levels of the video signals can be stably detected.

A composite signal processing circuit according to a modification of the present invention will be described with reference to FIG. 6. The reference numerals as in FIG. 6 denote parts similar to those shown in FIG. 4, and a detailed description thereof will be omitted.

Figure 6:
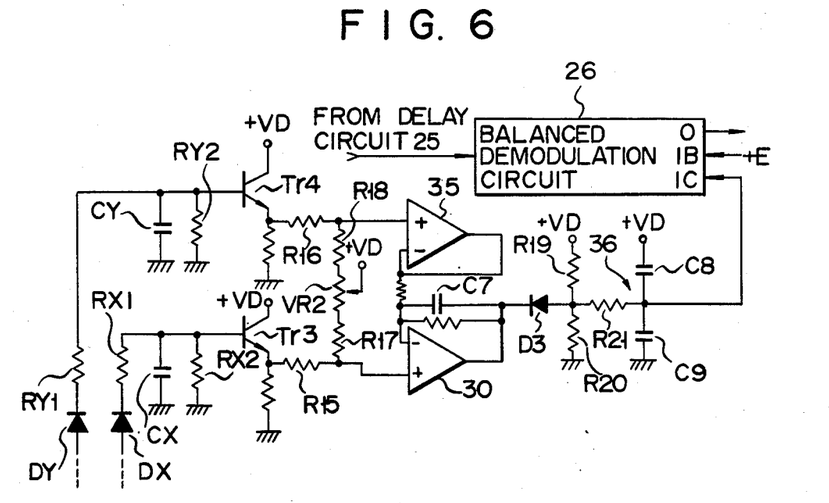
FIGS. 6 and 7 are, respectively, circuit diagrams showing modifications of a peak level correction circuit of the signal processing circuit of FIG. 4.

Referring to FIG. 6, the emitter of a transistor Tr3 is connected to the noninverting input terminal of a differential amplifier 30 through a resistor R15. The emitter of a transistor Tr4 is connected to the noninverting input terminal of an operational amplifier 35 of a voltage follower type through a resistor R16. An integrating capacitor C7 is connected between the inverting input terminal and the output terminal of the amplifier 30. A bias circuit having a resistor R17, a variable resistor VR2 and a resistor R18 connected in series with each other is connected between the noninverting input terminal of the amplifier 30 and the noninverting input terminal of the amplifier 35. The output terminal of the amplifier 30 is connected to the junction between resistors R19 and R20 through a diode limiter D3. One end of the resistor R19 is connected to the power supply terminal +VD, and one end of the resistor R20 is grounded. A voltage appearing at the junction between the resistors R19 and R20 is applied to an integrator 36. The integrator 36 includes a series circuit of a capacitor C8 connected at one end to the power supply terminal +VD and a capacitor C9 connected between the other end of the capacitor C8 and a ground, and a resistor R21 connected between the series circuit and the junction between the resistors R19 and R20. An output from the integrator 36 is supplied to an input terminal IC of a balanced modulation circuit 26.

With the above arrangement, the capacitor C7 cuts off an unnecessary AC component to eliminate noise. Due to the imbalance between the emitter voltages of the transistors Tr3 and Tr4, an offset voltage is generated by the amplifier 30. This offset voltage is corrected by applying DC voltages whose levels are oppositely changed in accordance with a change in the resistance of the resistor VR2 to the noninverting input terminals of the amplifiers 30 and 35. In this case, when an imbalanced component between the emitter voltages of the transistors Tr3 and Tr4 tends to have the same polarity, a bias circuit may be used to apply a DC voltage to one of the noninverting input terminals of the amplifiers 30 and 35.

Since the amplifier 35 is inserted in a signal path for a signal obtained by detecting a peak level of the delayed video signal, the signals generated from the transistors Tr3 and Tr4 can be easily balanced. Furthermore, the output from the amplifier 30 is integrated by the integrator 36 at a large time constant, so that the voltage applied to the circuit 26 can be sufficiently smoothed. Therefore, the peak level of the delayed video signal can be properly corrected. The integrator 36 has two capacitors C8 and C9 serially connected between the power supply terminal +VD and ground. The capacitors C8 and C9 are charged in accordance with a capacitance ratio thereof upon energization of the composite video signal processing circuit. A substantially normal voltage is obtained within a short period of time upon system energization, and the transient time can be shortened.

When the video signals are switched on, upon reading of the reproduction signal from the disk memory, noise is mixed into the readout reproduction signal, and an imbalanced state temporarily occurs in the outputs from the transistors Tr3 and Tr4. The imbalanced component is amplified by the amplifier 30 which then generates a high voltage. In order to prevent this voltage from being deviated in a positive direction, a circuit of the diode D3 and the resistors R19 and R20 is provided for limiting the voltage. More particularly, even if an output voltage from the amplifier 30 exceeds a voltage divided by the resistors R19 and R20, a high voltage will not be applied to the integrator 36 by operation of the diode D3. Therefore, a large transient voltage will not be applied to the integrator, and the operating point thereof will not be greatly changed. Flickering during a transient time in the video signal switching operation can also be prevented.

Figure 7:
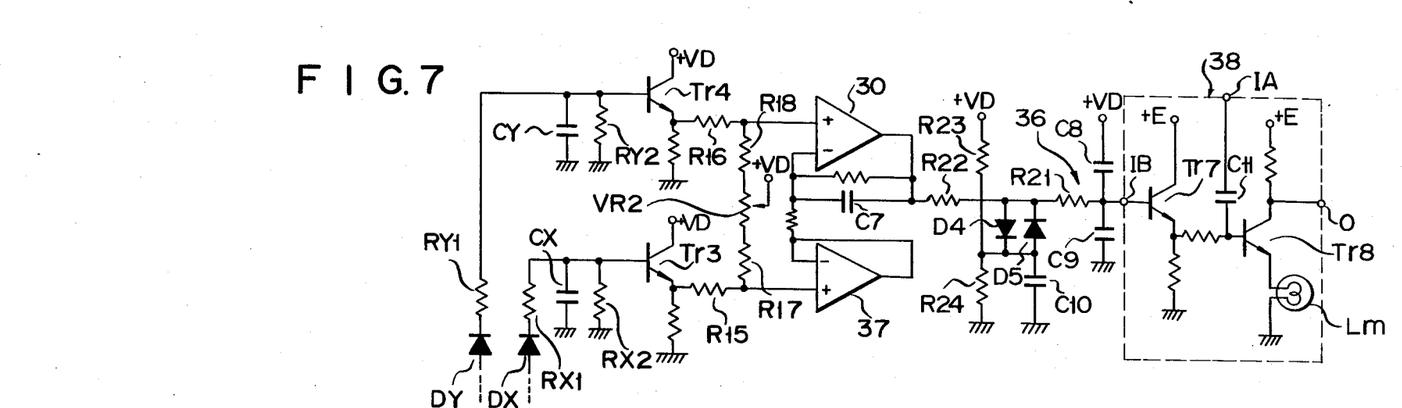

A circuit of FIG. 7 is similar to that of FIG. 6. A diode circuit having two diodes D4 and D5 crosscoupled with each other is used in place of the circuit (FIG. 6) of the diode D3 and the resistors R19 and R20. One terminal of the diode circuit is connected to the output terminal of a differential amplifier 30 through a resistor R22 and to the input terminal of an integrator 36. The other terminal of the diode circuit is grounded through a capacitor C10 and is connected to the junction of a resistors R23 and R24 which are connected between the power supply terminal +VD and a ground.

When the output from the amplifier 30 is greatly deviated in a negative or positive direction, such a deviation can be limited within a predetermined range so as to properly fix the operating point of the integrator 36.

In the circuit of FIG. 7, a variable gain amplifier 38 having transistors Tr7 and Tr8 and an incandescent lamp Lm which functions as a variable resistive element changing its resistance in response to a change in magnitude of a DC voltage applied thereto or DC current flowing there through is used in place of the balanced modulation circuit 26.

The amplifier 38 causes the emitter output of the transistor Tr7 of the emitter follower type to be supplied to the base of the transistor Tr8 through a resistor. An emitter DC voltage of the transistor Tr8 is applied to the incandescent lamp Lm. The delayed reproduction signal is supplied to the base of the transistor Tr8 through a capacitor C11. When the emitter voltage of the transistor Tr7 is increased, the emitter voltage of the transistor Tr8 is also increased, so that an internal resistance of the lamp Lm is increased. As a result, the gain of the transistor Tr8 is decreased. The circuit of FIG. 7 provides the same effect as in the circuit 26. In this case, a thermistor having positive or negative characteristics may be used in place of the incandescent lamp Lm.

Since such a variable gain amplifier using a variable resistive element can be used in place of the balanced modulation circuit 26, the circuit construction can be simplified at low cost.

Figure 8:
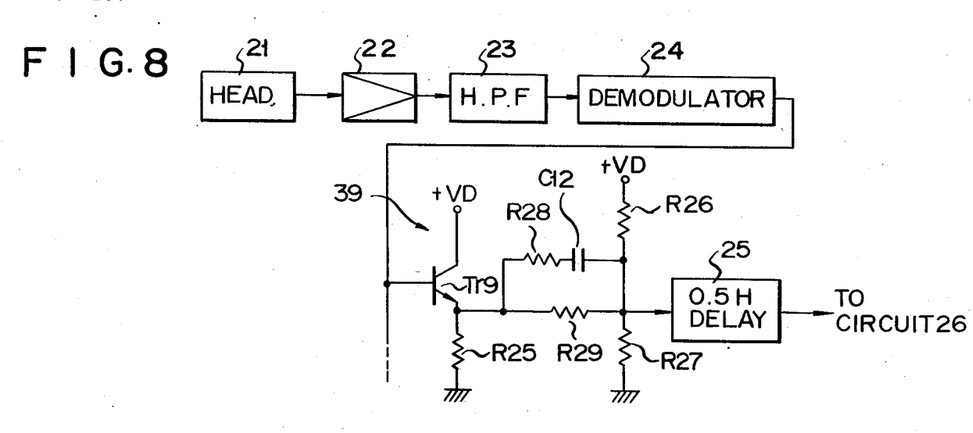
FIG. 8 is a circuit diagram of a waveform compensator which can be used in the signal processing circuit shown in FIG. 4.

In the circuit of FIG. 8, the 0.5H delay circuit 25 is constituted by, for example, a CCD element, and a waveform compensator 39 is connected to the input terminal of the delay circuit 25. The compensator 39 includes a series circuit of an npn transistor Tr9 and an emitter resistor R25; a series circuit of resistors R26 and R27; and a parallel circuit constituted by a resistor R29 and a series circuit of a resistor R28 and a capacitor C12 which is connected between the emitter of the transistor Tr9 and the junction between the resistors R26 and R27. In this circuit, conditions R28>>R29 and C12·R28≈H (horizontal sync period) are established.

Figure 9:
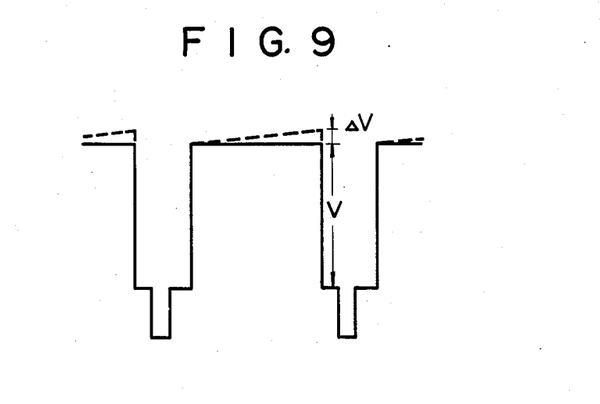
FIG. 9 is a timing chart for explaining the function of the waveform compensator shown in FIG. 8.

When the circuit of FIG. 8 is used, even if the delay circuit is constituted by a CCD element, and if a linearly increasing component is generated and distorted on the video signal as shown in FIG. 9 to cause a deviation ΔV with respect to a monochromatic image amplitude v, the waveform distortion can be compensated by the resistor R28 and the capacitor C12. As a result, a flat waveform can be obtained, as indicated by the solid line of FIG. 9. When this waveform compensator is not used, the right screen side is bright and the left screen side is dark due to the deviation ΔV, causing flickering at a frame frequency.

The waveform compensator may be connected to the output terminal of the delay circuit 25 to obtain the same effect as described above.

Figure 10:
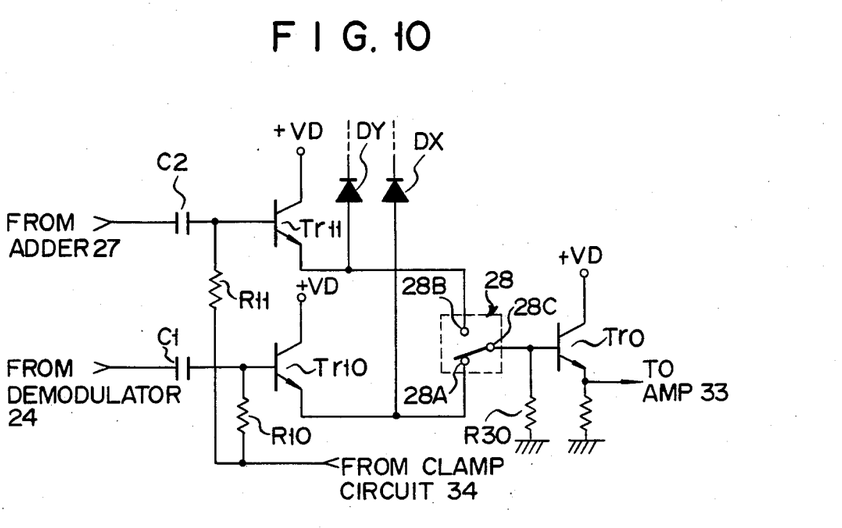
FIGS. 10, 11 and 12 are, respectively, circuit diagrams showing modifications of a signal selector used in the signal processing circuit of FIG. 4.

Referring to FIG. 10, in the signal processing circuit of FIG. 4, npn transistors Tr10 and Tr11 are used in place of the transistors Tr1 and Tr2, the collectors of the transistors Tr10 and Tr11 are connected to the power supply terminal +VD and their emitters are connected to stationary contacts 28A and 28B of an analog switch 28. At the same time, a common contact 28C of the switch 28 is grounded through a resistor R30 instead of being connected to the power supply terminal +VD through the loading resistor R7. Other arrangements of the circuit of FIG. 10 are substantially the same as those of FIG. 4.

The conductivity type of the transistors Tr10 and Tr11 is opposite to that of the transistors Tr1 and Tr2. However, the transistors Tr10 and Tr11 are alternately operated when the contact 28C is alternately coupled to the contacts 28A and 28B. Therefore, the same effect as in FIG. 4 can be obtained in the arrangement of FIG. 10.

Figure 11:
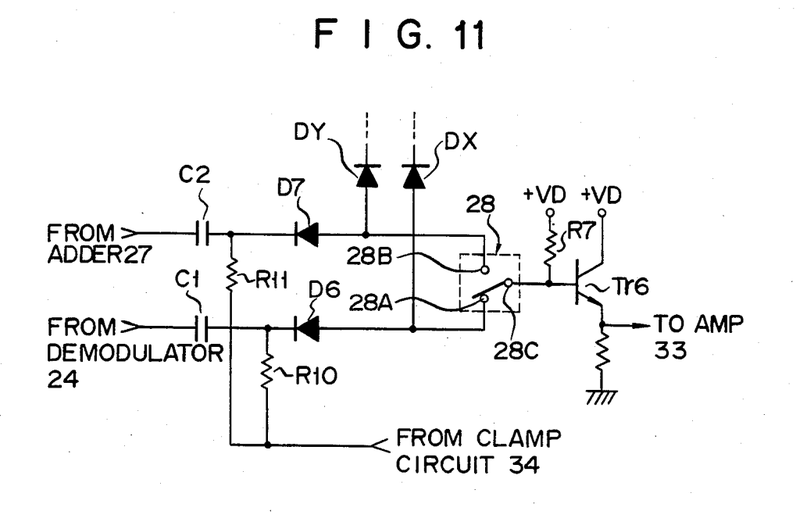

In an arrangement of FIG. 11, diodes D6 and D7 are used in place of the transistors Tr1 and Tr2. The diodes D6 and D7 are alternately operated when the contact 28C is alternately coupled to the contacts 28A and 28B, so that the same effect as in FIG. 4 can be obtained in the arrangement of FIG. 11.

Figure 12:
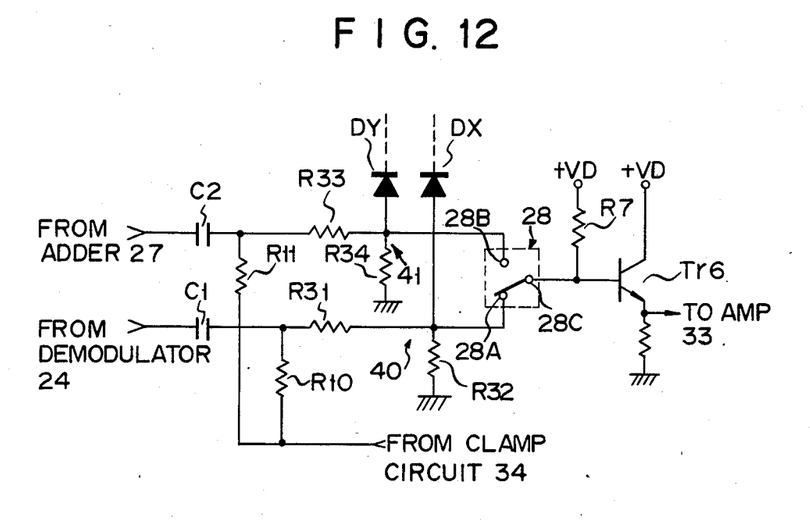

In an arrangement of FIG. 12, a voltage divider 40 of resistors R31 and R32 and a voltage divider 41 of resistors R33 and R34 are used in place of the transistors Tr1 and Tr2. The voltage dividers 40 and 41 are alternately operated when the contact 28C is alternately coupled to the contacts 28A and 28B, so that the same effect as in FIG. 4 can be obtained in the arrangement of FIG. 12.

The present invention is exemplified by the particular embodiments described above, but is not limited to those embodiments. For example, in the signal processing circuit of FIG. 4, the integrator 36 (FIG. 6) may be connected to the output terminal of the differential amplifier 30, and the output signal from the amplifier 30 can be accurately smoothed. Further, in the embodiment of FIG. 4, the level correction circuit including the balanced modulation circuit 26 and adder 27 is connected to process a 0.5H-delayed reproduction signal from the delay circuit 25. However, the level correction circuit can be connected to process a nondelayed reproduction signal from the demodulator 24. In this case, an output terminal of the delay circuit 25 is directly connected to the capacitor C2, an output terminal of the level correction circuit is connected to the capacitor C1, and the anodes of the diodes DX and DY are respectively connected to the emitters of the transistors Tr2 and Tr1.

What is claimed is

1. A television composite video signal processing circuit for producing a television composite video signal for image display, comprising:
   a reproduction circuit for deriving a reproduction signal which is obtained by repeatedly reading out a composite video signal of one field from a video signal memory means to constitute a composite video signal for displaying a one-frame image in accordance with a ½ interlaced scanning procedure, wherein said reproduction circuit is arranged so that said composite video signal includes peak levels above a certain pedestal level, and a sync tip level below said pedestal level;
   0.5H delay means, constituted by a charge-coupled device, for delaying the reproduction signal from said reproduction circuit by ½ of a horizontal sync period;
   signal selecting means for alternately passing therethrough a delayed reproduction signal from said delay means and the reproduction signal from said reproduction circuit for every field;
   pedestal clamp means for selectively setting pedestal levels of the delayed reproduction signal from said delay means and the reproduction signal from said reproduction circuit to match the pedestal levels with each other on accordance with an output signal from said signal selecting means;
   peak level correction means for correcting a peak level of one of a delayed video signal of the delayed reproduction signal from said delay means, and a nondelayed video signal of the nondelayed reproduction signal from said reproduction circuit, in accordance with a peak level difference between the delayed and nondelayed video signals to match the peak levels of the delayed and nondelayed video signals with each other; and
   sync tip level setting means for setting to a preset potential sync tip levels of the delayed and nondelayed reproduction signals which are supplied from said delay means and said reproduction circuit through said signal selecting means.

2. A circuit according to claim 1, wherein said peak level correction means comprises first and second peak level detectors for detecting the peak levels of the delayed and nondelayed video signals in the reproduction signals generated from said delay means and said reproduction circuit, and for generating output signals corresponding to the detected peak levels, respectively; a peak level difference detector for comparing the output signals from said first and second peak level detectors and generating an output signal corresponding to the peak level difference between the delayed and nondelayed video signals; and a peak level correction circuit for correcting the peak level of the delayed video signal from said delay means in accordance with the output signal from said peak level difference detector.

3. A circuit according to claim 2, wherein said first and said second peak level detectors each separately comprises a peak detection diode, a resistor connected in series with said peak detection diode, a parallel circuit connected between said resistor and a ground terminal and including a capacitor and a resistor, and an emitter follower circuit of a transistor operated in response to a voltage across said parallel circuit.

4. A circuit according to claim 3, wherein said peak level difference detector comprises a differential amplifier including an operational amplifier, and variable resistive means, connected to two input terminals of said differential amplifier, for applying DC voltages to change input voltage levels of said differential amplifier in opposite directions in accordance with a change in variable resistance of said variable resistive means, thereby correcting an offset voltage of said differential amplifier.

5. A circuit according to claim 3, wherein said peak level difference detector comprises a differential amplifier including an operational amplifier, and variable resistive means coupled to one input terminal of said differential amplifier to apply a variable DC voltage controlled by a variable resistor to said one input terminal of said differential amplifier, thereby correcting an offset voltage of said differential amplifier.

6. A circuit according to claim 3, wherein said peak level correction circuit comprises a balanced modulation circuit for generating a signal at a gain corresponding to a magnitude of an output level of said peak level difference detector, and means for superposing the output signal from said balanced modulation circuit on the delayed reproduction signal from said delay means, and for supplying a superposed signal to said signal selecting means.

7. A circuit according to claim 3, wherein said peak level correction circuit comprises a transistor and a variable resistor coupled to said transistor and changing a resistance thereof in accordance with a DC voltage applied thereto or a DC current flowing therethrough, the delayed reproduction signal from said 0.5H delay means being amplified by a gain corresponding to an output level of said peak level difference detector.

8. A circuit according to claim 3, wherein said peak level correction means further comprises an integrating circuit for integrating the output signal from said peak level difference detector.

9. A circuit according to claim 8, wherein said integrating circuit comprises two capacitors connected in series between a power supply terminal and a ground, and a resistor one end of which is connected to a common junction between said two capacitors and the other end of which is connected to the output terminal of said peak level difference detector.

10. A circuit according to claim 2, wherein said delay means comprises a 0.5H delay circuit and a waveform compensator which includes a resistor and a capacitor and which is coupled to one of the input and output terminals of said delay circuit to compensate for a signal distortion caused by said delay circuit.

11. A circuit according to claim 2, wherein said signal selecting means includes first and second emitter follower circuits whose bases are connected to receive output signals respectively from said reproduction circuit and adder means and each receive an output signal from said pedestal clamp means and whose emitters are respectively connected to said first and second peak level detectors, a switching circuit, and a resistor one end of which is connected to a supply terminal and the other end of which is connected to said emitters of said first and second emitter follower circuits through said switching circuit.

12. A circuit according to claim 2, wherein said peak level difference detector comprises a differential amplifier including an operational amplifier, and variable resistive means coupled to one input terminal of said differential amplifier to apply a variable DC voltage controlled by a variable resistor to said one input terminal of said differential amplifier, thereby correcting an offset voltage of said differential amplifier.

13. A circuit according to claim 2, wherein said peak level correction circuit comprises a transistor and a variable resistor coupled to said transistor and changing a resistance thereof in accordance with a DC voltage applied thereto or a DC current flowing therethrough, the delayed reproduction signal from said 0.5H delay means being amplified by a gain corresponding to an output level of said peak level difference detector.

14. A circuit according to claim 2, wherein said peak level correction means further comprises an integrating circuit for integrating the output signal from said peak level difference detector.

15. A circuit according to claim 2, wherein said peak level correction circuit comprises a balanced modulation circuit for generating a signal at a gain corresponding to the magnitude of an output level of said peak level difference detector, and means for superposing the output signal from said balanced modulation circuit on the delayed reproduction signal from said delay means, and for supplying a superposed signal to said signal selecting means.

16. A circuit according to claim 15, wherein said signal selecting means includes first and second emitter follower circuits whose bases are connected to receive output signals respectively from said reproduction circuit and adder means and each receive an output signal from said pedestal clamp means and whose emitters are respectively connected to said first and second peak level detectors, a switching circuit, and a resistor one end of which is connected to a power supply terminal and the other end of which is connected to said emitters of said first and second emitter follower circuits through said switching circuit.

17. A circuit according to claim 15, wherein said signal selecting means includes first and second transistor circuits whose bases are connected to respectively receive output signals from said reproduction circuit and adder means and each receive an output signal from said pedestal clamp means, whose emitters are respectively connected to said first and second peak level detectors, and whose collectors are connected to a power supply terminal, a switching circuit and a resistor one end of which is connected to a ground terminal and the other end of which is connected to said emitters of said first and second transistor circuits through said switching circuit.

18. A circuit according to claim 15, wherein said signal selecting means includes first and second diode circuits whose cathodes are respectively connected to output terminals of said reproduction circuit and adder means and also to an output terminal of said pedestal clamp means and whose anodes are connected to said first and second peak level detectors, respectively, a switching circuit and a resistor one end of which is connected to a power supply terminal and the other end of which is connected to said anodes of said first and second diode circuits through said switching circuit.

19. A circuit according to claim 15, wherein said signal selecting means includes first and second voltage-divider circuits which are respectively coupled at one end to output terminals of said reproduction circuit and adder means and at the other input terminal commonly connected to a ground terminal, and whose output terminals are respectively connected to said first and second peak level detectors, a switching circuit and a resistor one end of which is coupled to a power supply terminal and the other end of which is coupled to the output terminals of said first and second voltage-divider circuits through said switching circuit.

20. A circuit according to claim 1 wherein said delay means comprises a 0.5H delay circuit and a waveform compensator which includes a resistor and a capacitor and which is coupled to one of input and output terminals of said delay circuit to compensate for a signal distortion caused by said delay circuit.

21. A circuit according to claim 1, wherein said sync tip level setting means comprises a sync separator for separating a sync signal from an output signal of said signal selecting means, a capacitor, voltage-applying means for applying a predetermined voltage to said capacitor, and switching means connected between the output terminal of said signal selecting means and said capacitor to set the sync tip level of the output signal from said signal selecting means to said preset level in response to an output signal from said sync separator.

22. A television composite video signal processing circuit for producing a television composite video signal for image display, comprising:
   a reproduction circuit for deriving a reproduction signal which is obtained by repeatedly reading out a composite video signal of one field from a video signal memory means to constitute a composite video signal for displaying a one-frame image in accordance with a ½ interlaced scanning procedure;
   0.5H delay means, constituted by a charge-coupled device, for delaying the reproduction signal from said reproduction circuit by ½ of a horizontal sync period;
   signal selecting means for alternately passing therethrough a delayed reproduction signal from said delay means and the reproduction signal from said reproduction circuit for every field;
   pedestal clamp means for selectively setting pedestal levels of the delayed reproduction signal from said delay and the reproduction signal from said reproduction circuit to match the pedestal levels with each other in accordance with an output signal from said signal selecting means;

peak level correction means for correcting a peak level of one of a delayed video signal of the delayed reproduction signal from said delay means, and a nondelayed video signal of the nondelayed reproduction signal from said reproduction circuit, in accordance with a peak level difference between the delayed and nondelayed video signals to match the peak levels of the delayed and nondelayed video signals with each other; and sync tip level setting means for setting to a preset potential sync tip levels of the delayed and nondelayed reproduction signals which are supplied from said delay means and said reproduction circuit through said signal selecting means;

wherein said peak level correction means comprises first and second peak level detectors for detecting the peak levels of the delayed and nondelayed video siganls in the reproduction signals generated from said delay means and said reproduction circuit, and for generating output signals corresponding to the detected peak levels, respectively;

a peak level difference detector for comparing the output signals from said first and said second peak level detectors and generating an output signal corresponding to the peak level difference between the delayed and nondelayed video signals; and a peak level correction circuit for correcting the peak level of the delayed video signal from said delay means in accordance with the output signal from said peak level difference detector;

wherein said first and said second peak level detectors each separately comprises a peak detection diode, a resistor connected in series with said peak detection diode, a parallel circuit connected between said resistor and a ground terminal and including a capacitor and a resistor, and an emitter follower circuit of a transistor operated in response to a voltage across said parallel circuit.

23. A television composite video signal processing circuit for producing a television composite video signal for image display, comprising:

a reproduction circuit for deriving a reproduction signal which is obtained by repeatedly reading out a composite video signal of one field from a video signal memory means to constitute a composite video signal for displaying a one-frame image in accordance with a ½ interlaced scanning procedure;

0.5H delay means, constituted by a charge-coupled device, for delaying the reproduction signal from said reproduction circuit by ½ of a horizontal sync period;

signal selecting means for alternately passing therethrough a delayed reproduction signal from said delay means and the reproduction signal from said reproduction circuit for every field;

pedestal clamp means for selectively setting pedestal levels of the delayed reproduction signal from said delay means and the reproduction signal from said reproduction circuit to match the pedestal levels with each other in accordance with an output signal from said signal selecting means;

peak level correction means for correcting a peak level of one of a delayed video signal of the delayed reproduction signal from said delay means, and a nondelayed video signal of the nondelayed reproduction signal from said reproduction circuit, in accordance with a peak level difference between the delayed and nondelayed video signals to match the peak levels of the delayed and nondelayed video signals with each other; and sync tip level setting means for setting to a preset potential sync tip levels of the delayed and nondelayed reproduction signals which are supplied from said delay means and said reproduction circuit through said signal selecting means;

wherein said peak level correction means comprises first and second peak level detectors for detecting the peak levels of the delayed and nondelayed video signals in the reproduction signals generated from said delay means and said reproduction circuit, and for generating output signals corresponding to the detected peak levels, respectively;

a peak level difference detector for comparing the output signals from said first and said second peak level detectors and generating an output signal corresponding to the peak level difference between the delayed and nondelayed video signals; and a peak level correction circuit for correcting the peak level of the delayed video signal from said delay means in accordance with the output signal from said peak level difference detector;

wherein said signal selecting means includes first and second emitter follower circuits whose bases are connected to receive output signals respectively from said reproduction circuit and adder means and each receive an output signal from said pedestal clamp means and whose emitter are respectively connected to said first and second peak level detectors, a switching circuit, and a resistor one end of which is connected to a power supply terminal and the other end of which is connected to said emitters of said first and second emitter follower circuits through said switching circuit.

24. A television composite video signal processing circuit for producing a television composite video signal for image display, comprising:

a reproduction circuit for deriving a reproduction signal which is obtained by repeatedly reading out a composite video signal of one field from a video signal memory means to constitute a composite video signal for displaying a one-frame image in accordance with a ½ interlaced scanning procedure;

0.5H delay means, constituted by a charge-coupled device, for delaying the reproduction signal from said reproduction circuit by ½ of a horizontal sync period;

signal selecting means for alternately passing therethrough a delayed reproduction signal from said delay means and the reproduction signal from said reproduction circuit for every field;

pedestal clamp means for selectively setting pedestal levels of the delayed reproduction signal from said delay means and the reproduction signal from said reproduction circuit to match the pedestal levels with each other in accordance with an output signal from said signal selecting means;

peak level correction means for correcting a peak level of one of a delayed video signal of the delayed reproduction signal from said delay means, and a nondelayed video signal of the nondelayed reproduction signal from said reproduction circuit, in accordance with a peak level difference between the delayed and nondelayed video signals to match the peak levels of the delayed and nondelayed video signals with each other; and sync tip level setting means for setting to a preset potential sync tip levels of the delayed and nondelayed reproduction signals which are supplied from said delay means and said reproduction circuit through said signal selecting means;

wherein said peak level correction means comprises first and second peak level detectors for detecting the peak levels of the delayed and nondelayed video signals in the reproduction signals generated from said delay means and said reproduction circuit, and for generating output signals corresponding to the detected peak levels, respectively;

a peak level difference detector for comparing the output signals from said first and said second peak level detectors and generating an output signal corresponding to the peak level difference between the delayed and nondelayed video signals; and a peak level correction circuit for correcting the peak level of the delayed video signal from said delay means in accordance with the output signal from said peak level difference detector;

wherein said peak level difference detector comprises a differential amplifier including an operational amplifier, and variable resistive means coupled to one input terminal of said differential amplifier to apply a variable DC voltage controlled by a variable resistor to said one input terminal of said differential amplifier, thereby correcting an offset voltage of said differential amplifier.

25. A television composite video signal processing circuit for producing a television composite video signal for image display, comprising:

a reproduction circuit for deriving a reproduction signal which is obtained by repeatedly reading out a composite video signal of one field from a video signal memory means to constitute a composite video signal for displaying a one-frame image in accordance with a ½ interlaced scanning procedure;

0.5H delay means, constituted by a charge-coupled device, for delaying the reproduction signal from said reproduction circuit by ½ of a horizontal sync period;

signal selecting means for alternately passing therethrough a delayed reproduction signal from said delay means and the reproduction signal from said reproduction circuit for every field;

pedestal clamp means for selectively setting pedestal levels of the delayed reproduction signal from said delay means and the reproduction signal from said reproduction circuit to match the pedestal levels with each other in accordance with an output signal from said signal selecting means;

peak level correction means for correcting a peak level of one of a delayed video signal of the delayed reproduction signal from said delay means, and a nondelayed video signal of the nondelayed reproduction signal from said reproduction signal circuit, in accordance with a peak level difference between the delayed and nondelayed video signals to match the peak levels of the delayed and nondelayed video signals with each other; and sync tip level setting means for setting to a preset potential sync tip levels of the delayed and nondelayed reproduction signals which are supplied from said delay means and said reproduction circuit through said signal selecting means;

wherein said peak level correction means comprises first and second peak level detectors for detecting the peak levels of the delayed and nondelayed video signals in the reproduction signals generated from said delay means and said reproduction circuit, and for generating output signals corresponding to the detected peak levels, respectively;

a peak level difference detector for comparing the output signals from said first and said second peak level detectors and generating an output signal corresponding to the peak level difference between the delayed and nondelayed video signals; and a peak level correction circuit for correcting the peak level of the delayed video signal from said delay means in accordance with the output signal from said peak level difference detector;

wherein said peak level correction circuit comprises a transistor and a variable resistor coupled to said transistor and changing a resistance thereof in accordance with a DC voltage applied thereto or a DC current flowing therethrough, the delayed reproduction signal from said 0.5H delay means being amplified by a gain corresponding to an output level of said peak level difference detector.

26. A television composite video signal processing circuit for producing a television composite video signal for image display, comprising:

a reproduction circuit for deriving a reproduction signal which is obtained by repeatedly reading out a composite video signal of one field from a video signal memory means to constitute a composite video signal for displaying a one-frame image in accordance with a ½ interlaced scanning procedure;

0.5H delay means, constituted by a charge-coupled device, for delaying the reproduction signal from said reproduction circuit by ½ of a horizontal sync period;

signal selecting means for alternately passing therethrough a delayed reproduction signal from said delay means and the reproduction signal from said reproduction circuit for every field;

pedestal clamp means for selectively setting pedestal levels of the delayed reproduction signal from said delay means and the reproduction signal from said reproduction circuit to match the pedestal levels with each other in accordance with an output signal from said signal selecting means;

peak level correction means for correcting a peak level of one of a delayed video signal of the delayed reproduction signal from said delay means, and a nondelayed video signal of the nondelayed reproduction signal from said reproduction circuit, in accordance with a peak level difference between the delayed and nondelayed video signals to match the peak levels of the delayed and nondelayed video signals with each other; and sync tip level setting for setting to a preset potential sync tip levels of the delayed and nondelayed reproduction signals which are supplied from said delay means and said reproduction circuit through said signal selecting means;

wherein said peak level correction means comprises first and second peak level detectors for detecting the peak levels of the delayed and nondelayed video signals in the reproduction signals generated from said delay means and said reproduction circuit, and for generating output signals corresponding to the detected peak levels, respectively;

a peak level difference detector for comparing the output signals from said first and said second peak level detectors and generating an output signal corresponding to the peak level difference between the delayed and nondelayed video signals; and a peak level correction circuit for correcting the peak level of the delayed video signal from said delay means in accordance with the output signal from said peak level difference detector;

wherein said peak level correction circuit comprises a balanced modulation circuit for generating a signal at a gain corresponding to the magnitude of an output level of said peak level difference detector, and means for superposing the output signal from said balanced modulation circuit on the delayed reproduction signal from said delay means, and for supplying a superposed signal to said signal selecting means; and wherein said signal selecting means includes first and second emitter follower circuits whose bases are connected to receive output signals respectively from said reproduction circuit and adder means and each receive an output signal from said pedestal clamp means and whose emitters are respectively connected to said first and second peak level detectors, a switching circuit, and a resistor one end of which is connected to a power supply terminal and the other end of which is connected to said emitters of said first and second emitter follower circuits through said switching circuit.

* * * * *